UNITED STATES PATENT OFFICE.

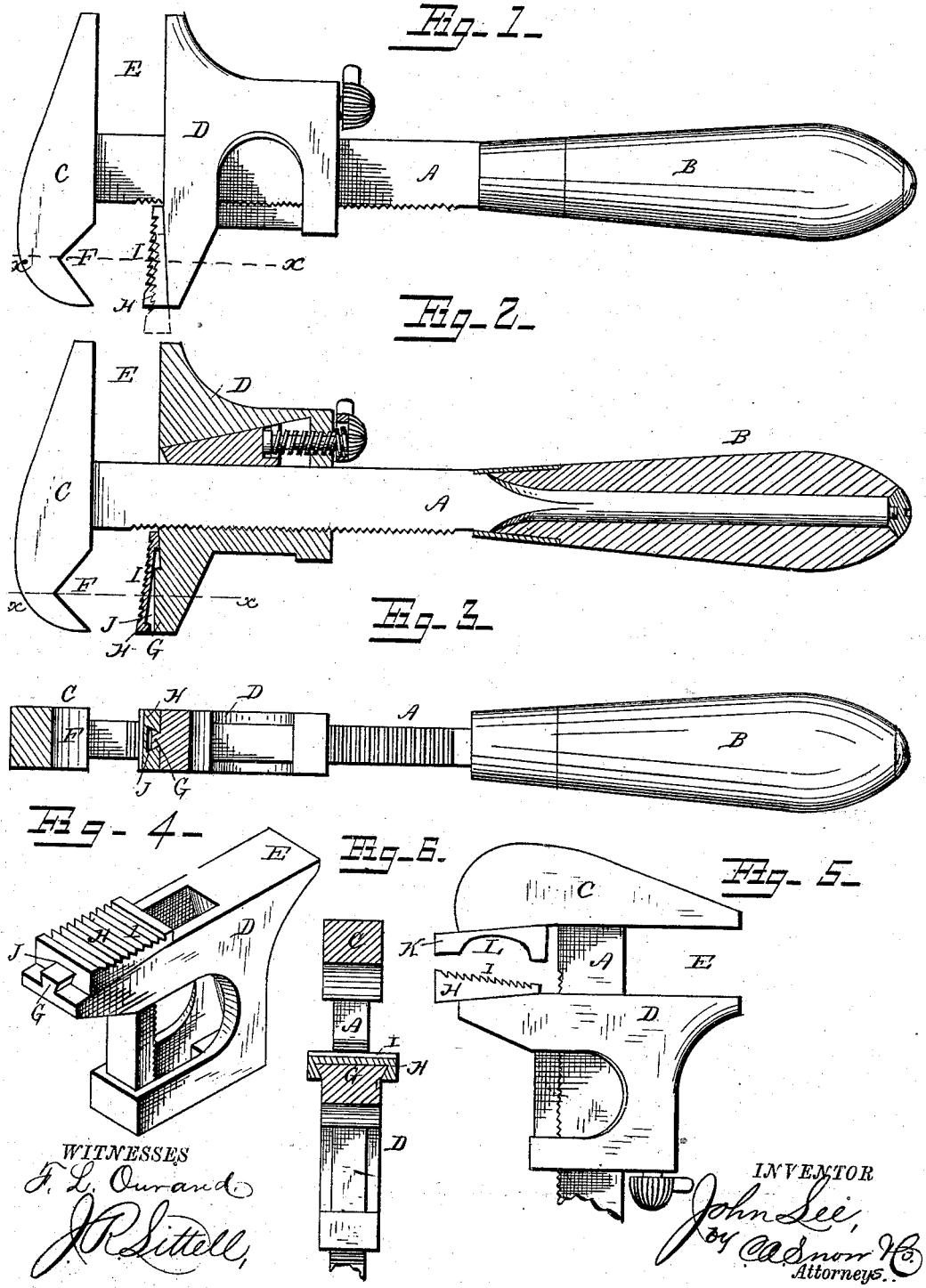

JOHN LEE, OF MANSFIELD, ASSIGNOR TO THE RUSSELL WRENCH AND NOVELTY COMPANY, OF RUSSELL, OHIO.

PIPE-WRENCH.

SPECIFICATION forming part of Letters Patent No. 269,072, dated December 12, 1882.

Application filed October 18, 1882. (No model.)

*To all whom it may concern:*

Be it known that I, JOHN LEE, a citizen of the United States, residing at Mansfield, in the county of Richland and State of Ohio, have invented a new and useful Pipe-Wrench, of which the following is a specification, reference being had to the accompanying drawings.

Figure 1 is a side view of my improved pipe-wrench. Fig. 2 is a longitudinal sectional view of the same. Fig. 3 is a transverse sectional view on the line *x x*, Fig. 1. Fig. 4 is a detail view, in perspective, of part of the sliding jaw with its sliding wedge. Fig. 5 is a side view, illustrating a modification; and Fig. 6 is a detail view of a modification.

The same letters refer to the same parts in all the figures.

This invention relates to that class of pipe-wrenches which are provided with a sliding jaw; and it consists in certain improvements in the construction of the same, which will be hereinafter fully described, and particularly pointed out in the claims.

In the drawings hereto annexed, A represents a shank, having a suitable handle, B, and provided at its upper end with a fixed jaw, C.

D is the movable jaw, which is fitted to slide upon the shank A, any suitable mechanism being employed to retain it in any position to which it may be adjusted.

The jaws C and D project, as shown, on both sides of the shank A. The sides E have flat parallel faces, adapted to grasp a nut, so that the device may, when desired, be used for a nut as well as for a pipe wrench. The face of the other side of the fixed jaw C has an angular or Λ-shaped recess, F, adapted to receive the pipe or cylindrical body to be operated upon. The corresponing side of the sliding jaw is provided at its outer end for a portion of its length with a lug or projection, G, formed longitudinally upon the face of the jaw, and having beveled or dovetailed sides. The outer end of the lug G is flush with the end of jaw D.

H is a wedge-shaped block, provided on its upper side with transverse teeth or ratchets I, and having in its under side a longitudinal dovetailed recess, J, extending from its outer large end toward its inner end. It will be seen that when the wedge H is adjusted upon the face of jaw D (which must be done before said jaw is placed upon the shank A) it has a sliding motion, which permits it to adjust itself so as to grip and hold the pipe or cylindrical body to be operated upon.

By the construction just described I am enabled to make the wedge H of the same length as the face of jaw D, and to slide beyond the latter, thus enabling the device to be used successfully upon pipes of various sizes.

The operation of my invention is obvious. After adjusting the sliding jaw so as to fit the pipe or body to be operated upon the wrench is turned in the proper direction, thus causing the teeth of the wedge to engage the pipe, whereby the wedge is drawn or forced in an inward direction so as to clamp the pipe securely.

In Fig. 5 of the drawings I have shown a modification of my invention, which consists in providing the fixed as well as the sliding jaw with a sliding wedge. The latter, which is denoted by letter K, has a curved or angular recess, L, which may be plain or toothed, as may be preferred, and the said wedge faces in the opposite direction of the wedge H, its inner end being the largest. I prefer to make the faces of the jaws C and D inclined, as shown, so as to bring the faces of the wedges nearly in a horizontal plane, whereby a better grip may be had and the operation is facilitated. The operation of this modification is the same as described above, and it has the advantage that a smaller movement of the wrench will be required to cause it to clutch securely the body to be operated upon.

In lieu of the dovetailed lug G, the sides of the jaw or jaws of my improved wrench may be simply beveled, as shown in Fig. 6 at R, for the reception of the sliding wedge.

I claim as my invention—

1. The combination, in a pipe-wrench, of the shank, the fixed jaw having an angular recess, the sliding jaw having a dovetailed lug at its outer end for a portion of its length, and the toothed wedge having a dovetailed recess extending from its outer toward its inner end, whereby it may be fitted to slide upon and beyond and yet be firmly retained upon the face of the sliding jaw, as set forth.

2. As an improvement in pipe-wrenches, the combination of the shank, the fixed jaw, the sliding jaw, and sliding wedges mounted upon the faces of the fixed and sliding jaws, and provided respectively with a curved or angular recess and with transverse teeth or ratchets, the said wedges being faced in opposite directions, as set forth.

In testimony that I claim the foregoing as my own I have hereto affixed my signature in presence of two witnesses.

JOHN LEE.

Witnesses:
WM. BAGGER,
J. REED LITTELL.